US008462465B1

(12) United States Patent
Adachi et al.

(10) Patent No.: US 8,462,465 B1
(45) Date of Patent: Jun. 11, 2013

(54) HEAD GIMBAL ASSEMBLY FOR MICROWAVE-ASSISTED MAGNETIC RECORDING IN IMPEDANCE MATCHING BETWEEN MICROWAVE RADIATION ELEMENT AND MICROWAVE TRANSMISSION LINE

(75) Inventors: Takuya Adachi, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/428,710

(22) Filed: Mar. 23, 2012

(51) Int. Cl.
*G11B 5/48* (2006.01)

(52) U.S. Cl.
USPC .......................................... 360/245.9

(58) Field of Classification Search
USPC ............ 360/245.9, 245, 245.7, 234.5, 245.3, 360/245.8
See application file for complete search history.

(56) References Cited

U.S. PATENT DOCUMENTS

| | | | | |
|---|---|---|---|---|
| 5,446,613 | A * | 8/1995 | Rottmayer | 360/319 |
| 5,717,547 | A * | 2/1998 | Young | 360/246 |
| 8,102,628 | B2 * | 1/2012 | Ota et al. | 360/245.9 |
| 8,208,227 | B2 * | 6/2012 | Ohsawa | 360/245.9 |
| 8,248,732 | B2 * | 8/2012 | Nishiyama et al. | 360/245.9 |
| 8,248,893 | B2 * | 8/2012 | Mochizuki et al. | 369/13.33 |
| 8,300,346 | B2 * | 10/2012 | Ikeda et al. | 360/59 |
| 8,305,712 | B2 * | 11/2012 | Contreras et al. | 360/245.9 |
| 2011/0090602 | A1 | 4/2011 | Nishiyama et al. | |
| 2011/0096638 | A1 * | 4/2011 | Mochizuki et al. | 369/13.33 |
| 2011/0242696 | A1 * | 10/2011 | Ikeda et al. | 360/59 |

FOREIGN PATENT DOCUMENTS

| JP | A-2009-251813 | 10/2009 |
|---|---|---|
| JP | A-2010-73297 | 4/2010 |

OTHER PUBLICATIONS

Zhu, Jian-Gang et al. "Microwave Assisted Magnetic Recording." *IEEE Transactions on Magnetics* 44.1 (2008): 125-131.

* cited by examiner

*Primary Examiner* — Allen T Cao
(74) *Attorney, Agent, or Firm* — Posz Law Group, PLC (57) ABSTRACT

A head gimbal assembly includes a magnetic head slider provided with a recording head element that applies a recording magnetic field to a magnetic recording medium and a suspension that supports the magnetic head slider. The magnetic head slider further includes a microwave radiation element that radiates a microwave magnetic field from a microwave excitation current that is supplied from a microwave generating circuit, and that applies the microwave magnetic field to the magnetic recording medium when the recording head element applies the recording magnetic field to the magnetic recording medium. The suspension includes a microwave transmission line that transmits the microwave excitation current, and the microwave transmission line is provided with a matching circuit to achieve impedance matching with the microwave radiation element.

10 Claims, 9 Drawing Sheets

HEAD GIMBAL ASSEMBLY FOR MICROWAVE-ASSISTED MAGNETIC RECORDING IN IMPEDANCE MATCHING BETWEEN MICROWAVE RADIATION ELEMENT AND MICROWAVE TRANSMISSION LINE

BACKGROUND OF THE INVENTION

1. Field of the Invention

The present invention relates to a head gimbal assembly on which a magnetic head slider having a microwave-assisted magnetic recording system is mounted.

2. Description of the Related Inventions

There is a demand for improvement in recording density of magnetic disk devices that are magnetic recording devices. In order to ensure the required signal quality (signal to noise (S/N) ratio) in high density recording, there is a need to reduce the size of magnetic particles that configure a magnetic recording medium in conjunction with the improvement of surface recording density. However, the magnetic particles having reduced size are more likely to cause a magnetization disappearance due to heat fluctuation. In order to prevent this problem and maintain a stable recording state, there is a need to increase magnetic anisotropy energy of the magnetic particles. When a material with high magnetic anisotropy energy is used, coercive force of the magnetic recording medium is increased, and therefore, a strong recording magnetic field becomes necessary to record to the magnetic recording medium. Meanwhile, the intensity of magnetic fields generated by a recording head element is limited by the material and shape of the recording head element, which makes recording with an intense recording magnetic field difficult.

In order to resolve this technical problem, energy assisted recording has been proposed in which, at the time of recording, supplemental energy is applied to a magnetic recording medium to lower effective coercive force. A recording system using a microwave magnetic field as a supplemental energy source is called microwave assisted magnetic recording (MAMR). Jian-Gang Zhu, Xiaochun Zhu, and Yuhui Tang, 'Microwave Assisted Magnetic Recording' IEEE TRANSACTIONS ON MAGNETICS, VOL. 44, NO. 1, JANUARY 2008 should be referred.

In microwave assisted magnetic recording, the system of supplying a microwave magnetic field by a microwave oscillator arranged in a tip end of a magnetic head, and the system of supplying a microwave excitation current, the signals being supplied from a microwave signal generating circuit that is independent from the magnetic head, to a microwave radiation element are known. The latter is called external oscillation system microwave assisted magnetic recording. With this system, because a microwave excitation current is supplied to a microwave radiation element that is formed near a recording head element of a magnetic head slider, a microwave transmission line should be provided on a suspension. Here, the suspension indicates a portion of a head gimbal assembly from which the magnetic head slider is excluded, which is, in other words, a support structure for the magnetic head slider.

In order to efficiently transmit a microwave excitation current, a high frequency transmission loss should be suppressed. U.S. Patent Application Publication No. 2011/0090602 discloses a microwave transmission line for efficiently supplying a microwave excitation current to a microwave radiation element of a magnetic head slider. Shields are provided above and below the microwave transmission line, and a conductive column that connects the shields is provided. By adjusting the position of the conductive column, the characteristic impedance of the microwave transmission line is controlled, and a microwave excitation current is accurately and efficiently transmitted.

JP Laid-Open Patent Application No. H09-251813 discloses a method in which a signal line of a flexible printing cable (FPC) is configured with a plurality of conductive lines that are connected in parallel so as to decrease the inductance of the signal line so that the high frequency transmission loss is suppressed.

The technologies described in the above-described documentations allow the control of the characteristic impedance of the microwave transmission line. However, in order to efficiently supply a microwave excitation current to the microwave radiation element, only the control of the characteristic impedance of the microwave transmission line on the suspension is insufficient. Specifically, it is required to suppress a reflection loss due to impedance mismatching between the microwave transmission line and the microwave radiation element.

Because the microwave radiation element is normally formed by a minute conductive line, an electrical resistance component thereof is extremely small. Accordingly, it is difficult to achieve impedance matching between the input impedance seen looking into the microwave radiation element at a terminal electrode of the microwave radiation element provided on the magnetic head slider and the input impedance seen looking into the microwave transmission line on the suspension at the terminal electrode.

SUMMARY

One of the objectives of the present invention is to provide a head gimbal assembly that allows to efficiently supply microwave signals to a microwave radiation element of a magnetic head slider.

A head gimbal assembly of the present invention includes a magnetic head slider provided with a recording head element that applies a recording magnetic field to a magnetic recording medium and a suspension that supports the magnetic head slider. The magnetic head slider further includes a microwave radiation element that radiates a microwave magnetic field from a microwave excitation current that is supplied from a microwave generating circuit, and that applies the microwave magnetic field to the magnetic recording medium when the recording head element applies the recording magnetic field to the magnetic recording medium. The suspension includes a microwave transmission line that transmits the microwave excitation current, and the microwave transmission line is provided with a matching circuit to achieve impedance matching with the microwave radiation element.

When the matching circuit is provided in the microwave transmission line on the suspension and impedance matching between the microwave radiation element formed in the magnetic head slider and the microwave transmission line is performed, transmission loss of a microwave excitation current is decreased, thereby allowing for effective supplying of a microwave excitation current to the microwave radiation element.

The above description, as well as other objects, features, and advantages of the present specification will be evident by the detailed description that follows below with reference to attached drawings exemplifying the present specification.

DETAILED DESCRIPTION OF THE INVENTION

Hereinafter, descriptions will be given of embodiments of the present invention with reference to the drawings. The dimensions of the configuration elements and the dimensions between the configuration elements in the drawings may differ from the actual configuration for easy viewing in the drawings.

Figure 1:
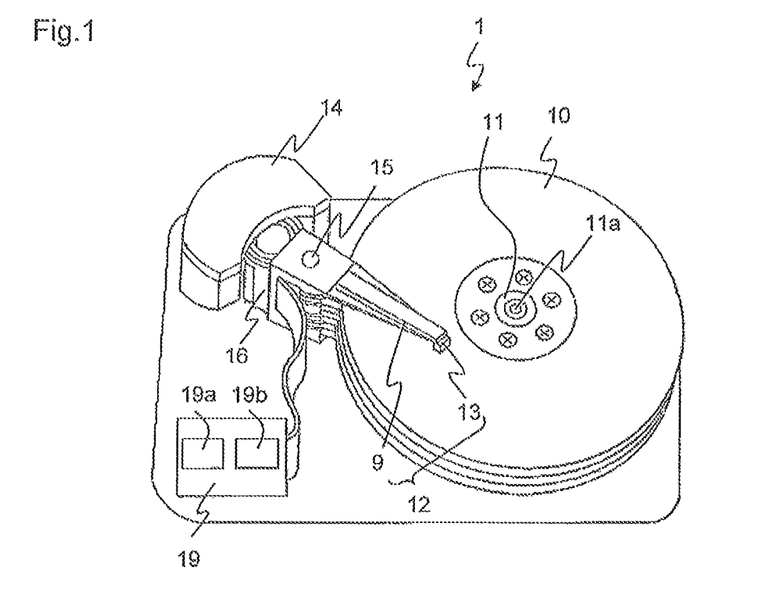
FIG. 1 is a plan view of a magnetic recording device (magnetic disk device).

FIG. 1 illustrates a schematic perspective view of a magnetic recording/reproducing device (magnetic disk device). A magnetic recording/reproducing device 1 has a plurality of magnetic recording media (magnetic disks) 10, and a plurality of head gimbal assemblies (HGA) 12 that each includes a magnetic head slider 13. The HGA 12 is configured with the magnetic head slider 13 and a suspension 9 that supports the magnetic head slider 13. The magnetic recording medium 10 rotates around a rotational shaft 11a by a spindle motor 11. The magnetic head slider 13 writes data signals to and reads data signals from the magnetic recording medium 10. In the present invention, the magnetic head slider 13 need only be able to write data signals to the magnetic recording medium 10. The suspension 9 is firmly attached to a carriage 16 that is rotatable around a pivot bearing shaft 15. The suspension 9 conducts positioning of the magnetic head slider 13 above the magnetic recording medium 10 with a voice coil motor (VCM) 14. A recording/reproducing/resonance control circuit 19 controls a writing/reading operation of the magnetic head slider 13 and also functions as a microwave generating circuit that generates and controls a microwave excitation current for ferromagnetic resonance, which will be described hereinafter. More specifically, the recording/reproducing/ resonance control circuit 19 is provided with a microwave signal generating circuit 19a that is connected to a microwave signal transmission line 22c, which will be described hereinafter, and a control unit 19b of the microwave signal generating circuit 19a.

Figure 2:
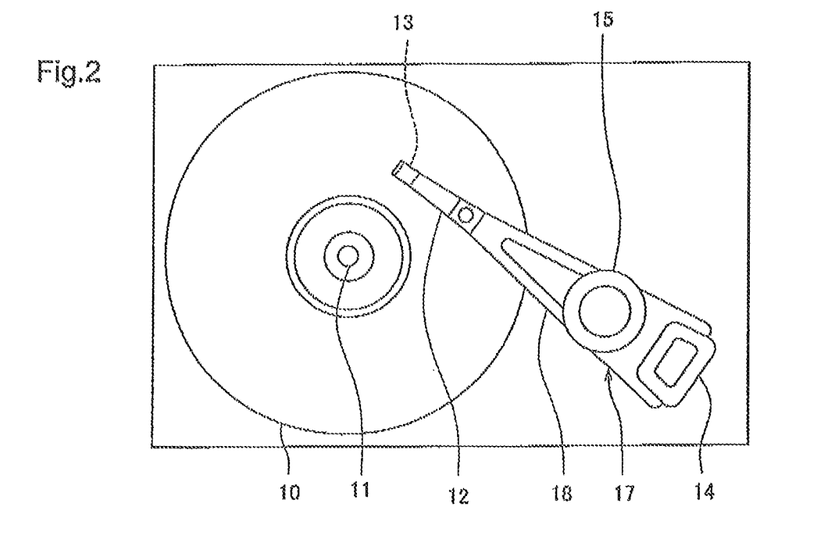
FIG. 2 is a plan view of a head arm assembly.

The HGA 12 may be supported by a drive arm 18 as illustrated in FIG. 2. In this case, a structure in which the HGA 12 and the drive arm 18 are combined may be called a head arm assembly 17. In either one of the configurations of FIG. 1 and FIG. 2, there is no restriction in the number of HGA 12, and only a single piece of the magnetic recording medium 10 and a single piece of the HGA 12 (and a single piece of the drive arm 18) may be provided in the magnetic recording/ reproducing device 1. The following description will be given based on the configuration illustrated in FIG. 2.

Figure 3A:
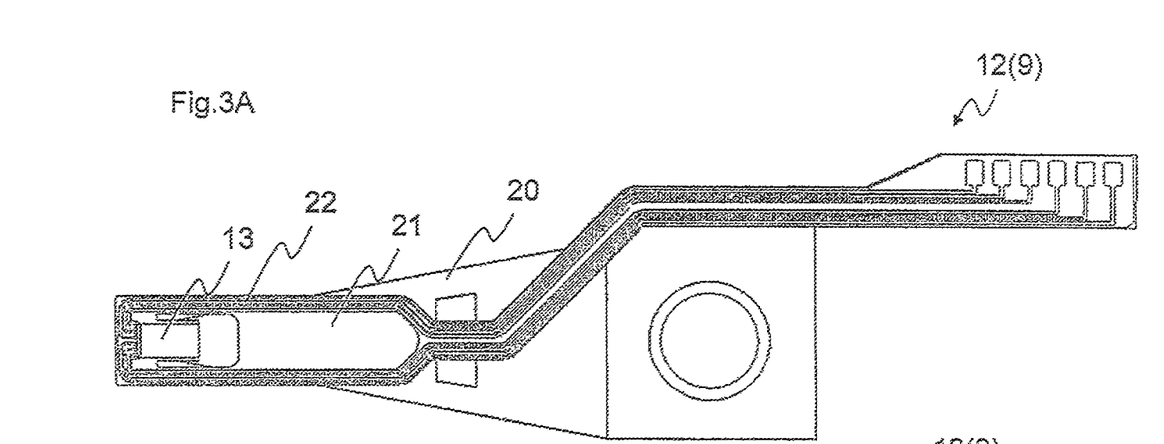
FIGS. 3A and 3B are respectively a plan view and a lateral view of a head gimbal assembly.
Figure 3B:
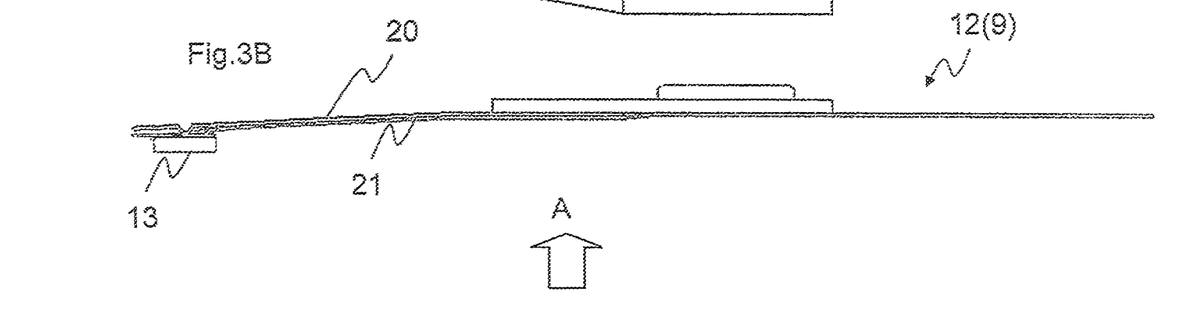

FIGS. 3A and 3B are respectively a plan view (bottom surface view from the perspective of the magnetic recording medium side) and a lateral view of a head gimbal assembly (HGA). The suspension 9 of the HGA 12 has a flexure 21 on one end side of which the magnetic head slider 13 is mounted and a load beam 20 that holds the magnetic head slider 13 and the flexure 21. The flexure 21 is elastically deformable and has a gimbal function that allows the magnetic head slider 13 to follow the fluctuation of the surface of the magnetic recording medium 10. Transmission lines 22 are formed on the surface of the flexure 21. The flexure 21 is linked to the load beam 20, and the load beam 20 is connected to the drive arm 18 that conducts positioning of the magnetic head slider 13 above the magnetic recording medium.

Figure 4:
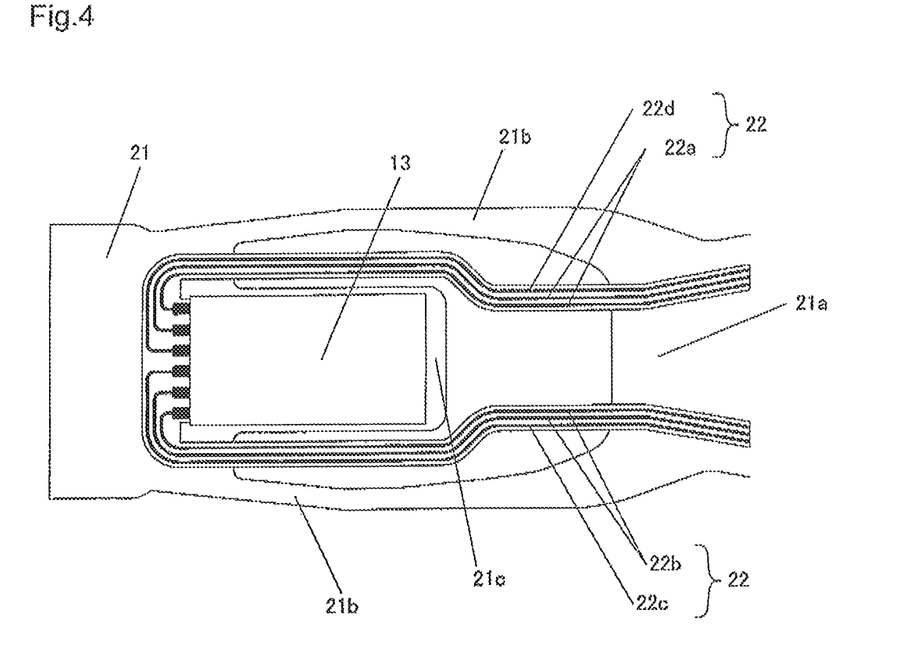
FIG. 4 is a plan view of a main portion of a head gimbal assembly.

FIG. 4 schematically illustrates a configuration of the head gimbal assembly in the vicinity of the magnetic head slider and paths of the transmission lines 22. This drawing is a bottom view of the magnetic head slider 13 and the flexure 21, which are viewed from the direction A of FIG. 3B. The flexure 21 has a main body part 21a, a support part 21c for the magnetic head slider 13, and a linkage part 21b that links the main body part 21a and the support part 21c. The linkage part 21b is composed of a pair of arm parts, and the arm parts are designed to have lower rigidity compared to the rigidity of the main body part 21a and the support part 21c.

The transmission lines 22 have recording signal transmission lines 22a for transmitting recording signals to a recording head element of the magnetic head slider 13, reproducing signal transmission lines 22b for taking reproducing output voltage out of a reproducing head element, a microwave signal transmission line (excitation current transmission line) 22c for transmitting a microwave excitation current, and a ground wiring line 22d. The transmission lines 22 may include, according to the functions of the magnetic head, a transmission line for a heater for adjusting a flying height and/or a transmission line for a sensor for detecting a flying height (both not illustrated). The microwave signal transmission line 22c may be configured as a single line or may also be configured as a differential signal transmitting wiring line (not illustrated). The transmission lines 22a, 22b, 22c, and 22d are typically formed of copper.

Figure 5:
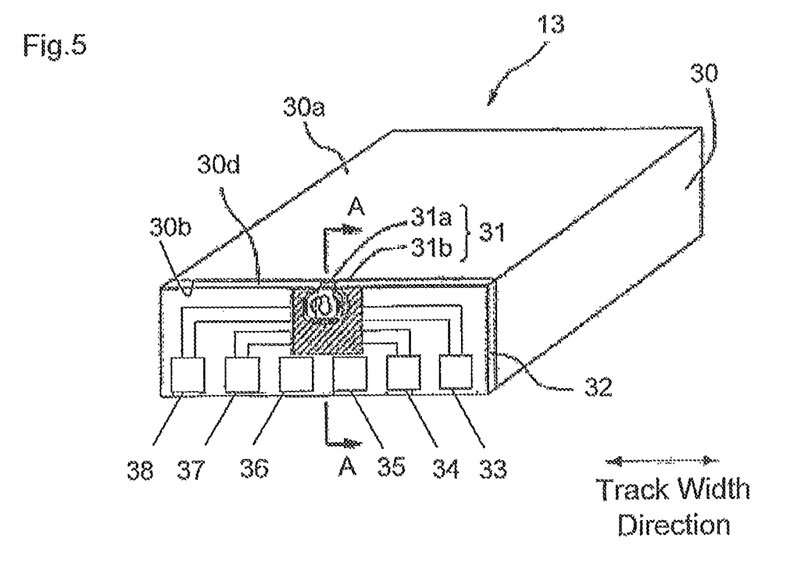
FIG. 5 is a schematic perspective view of a magnetic head slider.

FIG. 5 is a perspective view schematically illustrating the entirety of the magnetic head slider 13 according to the present embodiment. The magnetic head slider 13 is provided with a magnetic head slider substrate 30 having an air bearing surface (ABS) 30a that has been processed so as to obtain a suitable flying height, a magnetic head element 31 provided on an element formation surface 30b that is perpendicular to the ABS 30a, a protective part 32 that is provided on the element formation surface 30b so as to cover the magnetic head element 31, and six terminal electrodes 33, 34, 35, 36, 37, and 38 that are exposed from the surface of the protective part 32. The positions of the terminal electrodes 33, 34, 35, 36, 37, and 38 are not limited to the positions illustrated in FIG. 5, and they may be provided in any arrangement and in any positions of the surface of the protective part 32. When a heater and/or a sensor are/is provided, a terminal electrode that is electrically connected to them/it is provided.

The magnetic head slider 13 is mainly configured with a magneto-resistive effect (MR) reproducing head element 31a for reading data signals from the magnetic recording medium, and a recording head element 31b for writing data signals to the magnetic recording medium. The terminal electrodes 33 and 34 are electrically connected to the MR reproducing head element 31a, the terminal electrodes 37 and 38 are electrically connected to the recording head element 31b, and the terminal electrode 35 is electrically connected to a microwave radiation element 39, which will be described hereinafter.

Tip ends of the transmission lines 22a, 22b, 22c, and 22d on the magnetic head slider 13 side are respectively connected to terminal electrodes of the recording head element 31b, the reproducing head element 31a, and the microwave radiation element 39 by ball bonding in the present embodiment. Also, the transmission lines 22a, 22b, 22c, and 22d may respectively be connected to the terminal electrodes by wire bonding instead of ball bonding.

In the MR reproducing head element 31a and the recording head element 31b, the respective end parts of the elements are positioned on the ABS 30a (more specifically, on a magnetic head slider end surface 30d of the ABS 30a). When one end of the MR reproducing head element 31a and one end of the recording head element 31b oppose the magnetic recording medium, reproduction of data signals by sensing a signal magnetic field and recording of data signals by applying a signal magnetic field are conducted. The respective end parts of the elements on the ABS 30a and its vicinity are coated by an extremely thin diamond-like carbon (DLC) or the like for protection.

Figure 6:
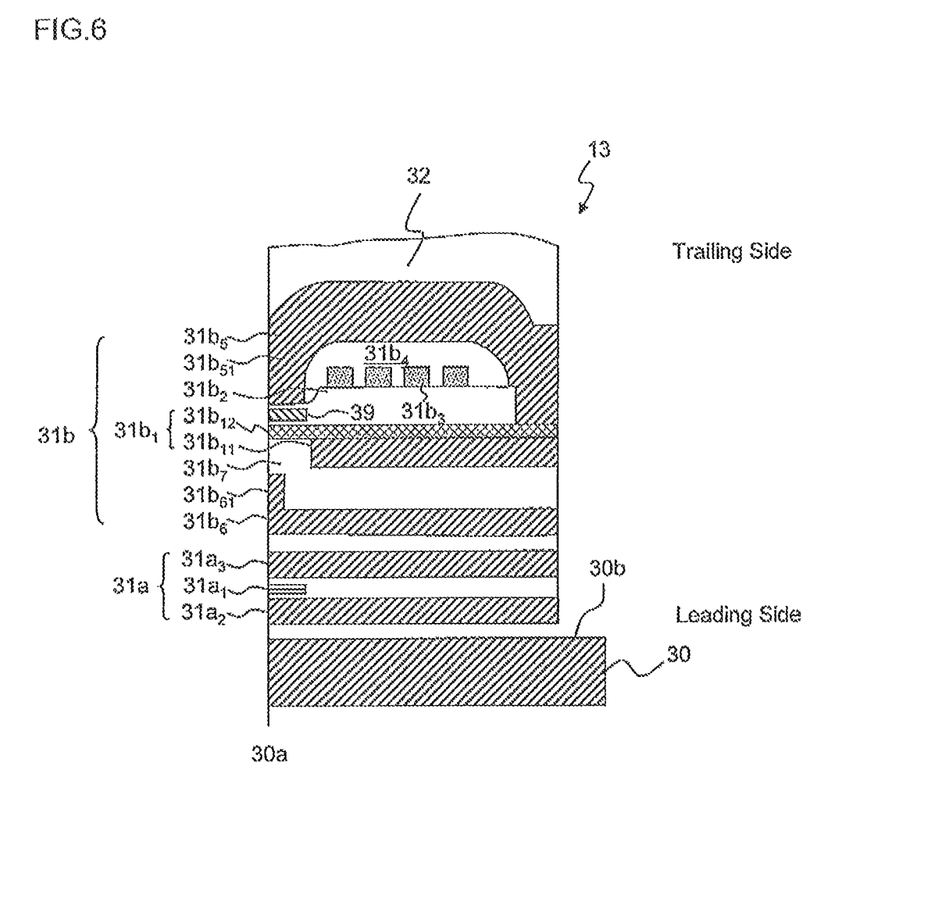
FIG. 6 is a schematic cross-sectional view of the magnetic head slider.

FIG. 6 is a cross-sectional view along the line A-A of FIG. 5. The MR reproducing head element 31a, the recording head element 31b, the microwave radiation element 39, and the protective part 32 that protects these elements, are mainly formed above the element formation surface 30b of the magnetic head slider substrate 30 made of ALTIC ($Al_2O_3$—TiC) or the like.

The MR reproducing head element 31a includes an MR stack $31a_1$, and a lower shield layer $31a_2$ and an upper shield layer $31a_3$ that are arranged in a position to sandwich the stack. The MR stack $31a_1$ is composed of a current-in-plane (CIP) GMR multilayer film, a current-perpendicular-to-plane (CPP) GMR multilayer film, or a TMR multilayer film, and senses a signal magnetic field from the magnetic recording medium. The lower shield layer $31a_2$ and the upper shield layer $31a_3$ prevent the MR stack $31a_1$ from receiving effects of external magnetic fields, which would be noise for the MR stack $31a_1$.

The recording head element 31b has a configuration for perpendicular magnetic recording. More specifically, the recording head element 31b is provided with a main pole layer $31b_1$, a trailing gap layer $31b_2$, a writing coil $31b_3$ formed in a manner of passing between the main pole layer $31b_1$ and an auxiliary pole layer $31b_5$, a writing coil insulating layer $31b_4$, the auxiliary pole layer $31b_5$, an auxiliary shield layer $31b_6$, and a leading gap layer $31b_7$. The main pole layer $31b_1$ is a main pole of the recording head element 31b, and generates a recording magnetic field from an end part of the main pole layer $31b_1$ on the ABS 30a side at the time of writing data signals.

The main pole layer $31b_1$ is a magnetic guide path. The magnetic guide path guides a magnetic flux, while letting the magnetic flux focus, to a magnetic recording layer of the magnetic recording medium. Herein, the magnetic flux is generated by applying a write current to the writing coil $31b_3$, and the magnetic recording layer is a layer to which writing is conducted. The main pole layer $31b_1$ is configured with a main pole yoke layer $31b_{11}$ and a main pole major layer $31b_{12}$.

The auxiliary pole layer $31b_5$ and the auxiliary shield layer $31b_6$ are arranged respectively in the trailing side and the leading side of the main pole layer $31b_1$.

The end parts of the auxiliary pole layer $31b_5$ and the auxiliary shield layer $31b_6$ on the ABS 30a sides are respectively a trailing shield part $31b_{51}$ and a leading shield part $31b_{61}$ that each has a wider layer cross section than the other portions. The trailing shield part $31b_{51}$ opposes the end part of the main pole layer $31b_1$ on the ABS 30a side through the trailing gap layer $31b_2$ therebetween. The leading shield part $31b_{61}$ opposes the end part of the main pole layer $31b_1$ on the ABS 30a side through the leading gap layer $31b_7$ therebetween. By providing the trailing shield part $31b_{51}$ and the leading shield part $31b_{61}$ that are described above, a magnetic field gradient of a recording magnetic field between the end part of the trailing shield part $31b_{51}$ and the end part of the main pole layer $31b_1$ and between the end part of the leading shield part $31b_{61}$ and the end part of the main pole layer $31b_1$ becomes even steeper due to a magnetic flux shunt effect. As a result, signal output jitter is diminished, and thereby an error rate at the time of reading can be reduced.

It is also possible to provide a so-called side surface shield by suitably processing the auxiliary pole layer $31b_5$ or the auxiliary shield layer $31b_6$ and arranging a portion of the auxiliary pole layer $31b_5$ or the auxiliary shield layer $31b_6$ near both sides of the main pole layer $31b_1$ in the track width direction. In this case, the magnetic flux shunt effect is enhanced.

The microwave radiation element 39 is formed between the main pole major layer $31b_{12}$ of the main pole layer $31b_1$ and the trailing shield part $31b_{51}$ of the auxiliary pole layer $31b_5$.

Figure 7:
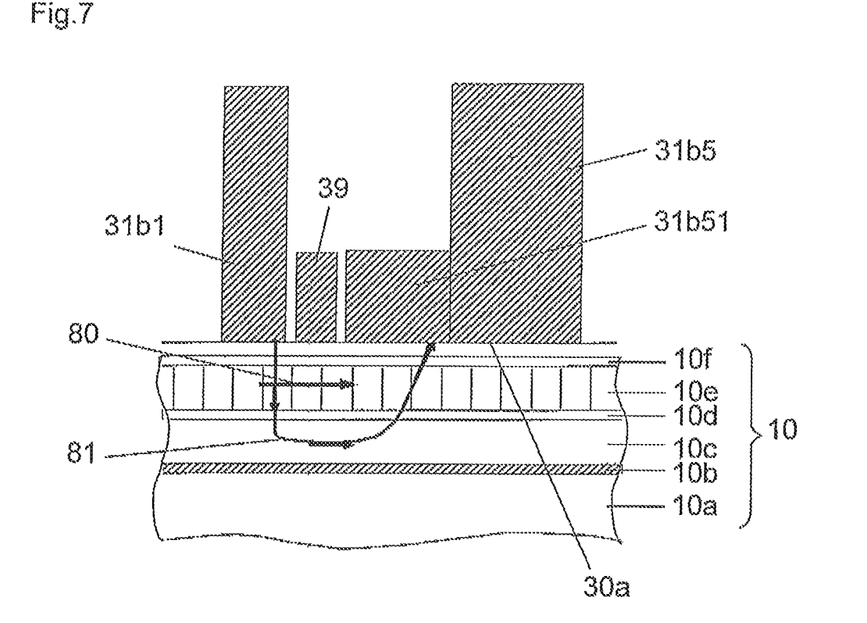
FIG. 7 is a schematic view for explaining the principle of a microwave assisted magnetic recording method.

FIG. 7 is a cross-sectional view for explaining the principle of the microwave assisted magnetic recording method. By supplying a microwave excitement current from the terminal electrodes, the microwave radiation element 39 radiates a microwave magnetic field and applies the microwave magnetic field to the magnetic recording medium 10 that is located adjacent to the microwave radiation element 39. The magnetic recording medium 10 is for perpendicular magnetic recording, and has a multilayered structure in which a magnetization orientation layer 10b, a soft magnetic under layer 10c that functions as a part of the magnetic flux loop circuit, an intermediate layer 10d, a magnetic recording layer 10e, and a protective layer 10f are sequentially laminated above a disk substrate 10a.

The magnetization orientation layer 10b stabilizes a magnetic domain structure of the soft magnetic under layer 10c to enhance suppression of spike noise in the reproducing output waveform by applying magnetic anisotropy in the track width direction to the soft magnetic under layer 10c. The intermediate layer 10d functions as a base layer that controls magnetization orientation and particle size of the magnetic recording layer 10e.

The ferromagnetic resonant frequency $f_{FMR}$ of the magnetic recording layer 10e is an inherent value that is determined by shape, size, configuration elements, and the like of magnetic particles that configure the magnetic recording layer 10e and by intensity of a recording magnetic field; however, generally the $f_{FMR}$ is approximately 1-50 GHz.

A microwave magnetic field is generated in the periphery of the microwave radiation element 39 by applying a microwave excitation current to a conductor that configures the microwave radiation element 39. A resonant magnetic field 80 that is oriented in a substantially in-plane direction of the magnetic recording medium is applied to the magnetic recording medium because the microwave radiation element 39 is adjacent to the magnetic recording medium. The resonant magnetic field 80 is a microwave magnetic field in a microwave band having the ferromagnetic resonant frequency $f_{FMR}$ of the magnetic recording layer 10e of the magnetic recording medium 10 or a frequency close to the ferromagnetic resonant frequency $f_{FMR}$ (for example, a frequency within ±10% with respect to the ferromagnetic resonant frequency $f_{FMR}$).

The coercive force of the magnetic recording layer 10e can be efficiently reduced by applying the resonant magnetic field 80 in a superimposition manner to a perpendicular recording magnetic field 81 that is applied to the magnetic recording layer from the main pole layer $31b_1$ of the recording head element 31b. As a result, the intensity of the recording magnetic field in the perpendicular direction (perpendicular or substantially perpendicular direction to a top layer surface of the magnetic recording layer 10e), the intensity being required for writing, can significantly be reduced. When the coercive force is reduced, magnetization reversal is more likely to occur. Thereby recording can efficiently be conducted with a small recording magnetic field.

In order to intensify the intensity of a microwave magnetic field that is radiated from the microwave radiation element 39, it is preferred that the impedance of an end part of the microwave radiation element 39 is substantially in a short-circuited state.

Figure 8:
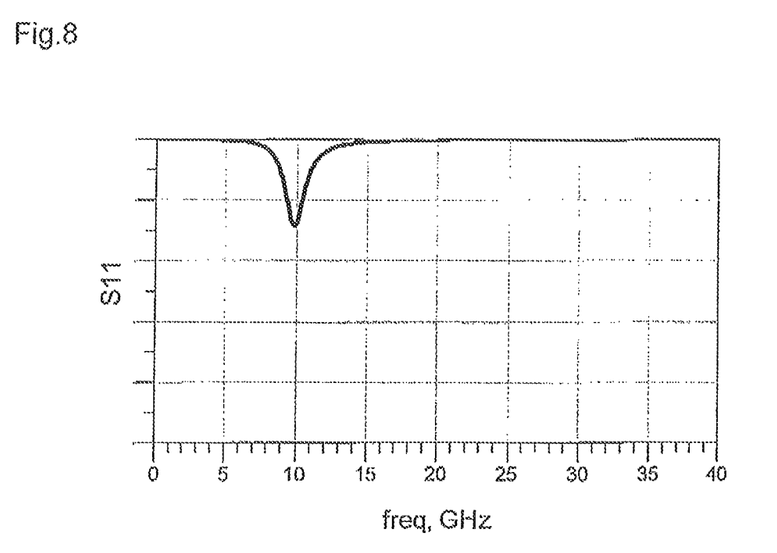
FIG. 8 is a graph illustrating a frequency characteristic of an absorption peak due to resonance of a magnetization.

In the state where a perpendicular recording magnetic field 81 is applied to the magnetic recording layer 10e from the main pole layer $31b_1$ of the recording head element 31b, when the frequency of a microwave magnetic field that is radiated from the microwave radiation element 39 corresponds to the ferromagnetic resonant frequency $f_{FMR}$ of the magnetic recording layer 10e, energy absorption due to resonance occurs. At this time, an absorption peak is observed in the scattering parameter (S11) which the terminal electrode 35 of the microwave radiation element 39 is used as a reference surface. S11 indicates a reflection coefficient of an input side. FIG. 8 illustrates one example of the scattering parameter (S11), and the absorption peak is observed in the vicinity of 10 GHz that is near the ferromagnetic resonant frequency $f_{FMR}$.

Figure 9:
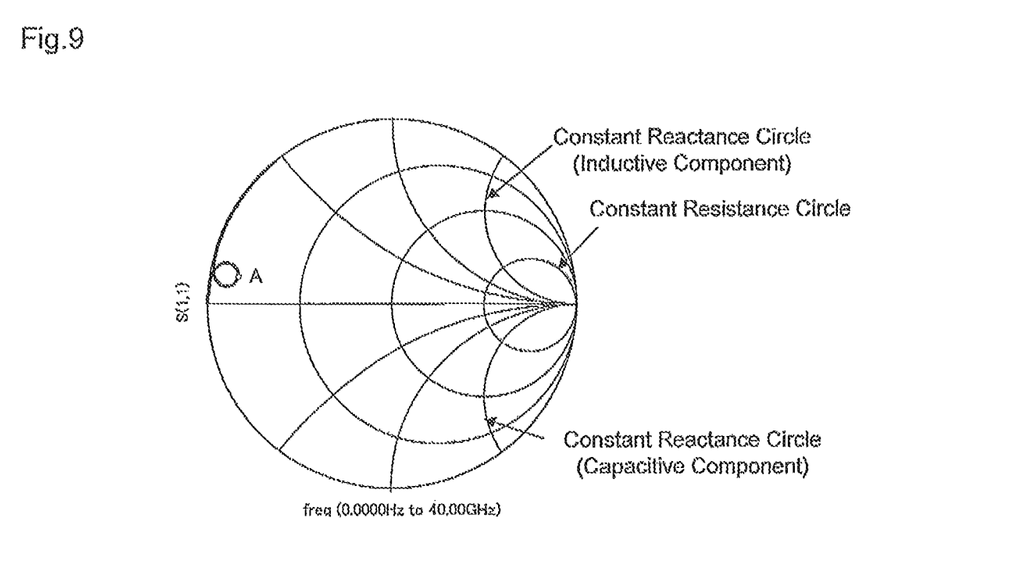
FIG. 9 is a view illustrating an input impedance of the short-circuited microwave radiation element.

FIG. 9 is a smith chart that illustrates the scattering parameter (S11), and a reference impedance is set as Z0. FIG. 9 illustrates an input impedance $Zin_1$, seen looking into the microwave radiation element 39 at the terminal electrode 35. The circles in the figure indicate constant resistance circles; curved lines extending upward and downward from the right end indicate portions of constant reactance circles; and the lines extending upward indicate an inductive component and the lines extending downward indicate a capacitive component. The input impedance seen looking into the microwave signal transmission line 22c at the terminal electrode 35 is an input impedance $Zin_2$. When $Zin_1$ and $Zin_2$ are complex conjugate, impedance matching is achieved, and a microwave excitation current from the control unit 19b of the microwave signal generating circuit 19a is supplied to the microwave radiation element 39 without any loss due to reflection.

When the input impedance $Zin_2$ seen looking into the microwave signal transmission line 22c at the terminal electrode 35 is equal to Z0, impedance matching is achieved by moving a point A to the center of the smith chart by adding a matching circuit.

The point A of FIG. 9 indicates the input impedance $Zin_1$ at the ferromagnetic resonant frequency $f_{FMR}$ of a magnetization under the state where a recording magnetic field is applied to the magnetic recording layer 10e. Energy absorption due to resonance is observed as a variation of a real resistance component (temporal shift to a constant resistance circle with large resistance) of impedance.

In the present invention, impedance matching is more likely to be achieved by applying a microwave magnetic field at a resonant frequency of a magnetization of the magnetic recording medium or at a frequency near the resonant frequency to the microwave radiation element 39 and by regarding the energy absorption due to resonance as the real resistance component.

Figure 10:
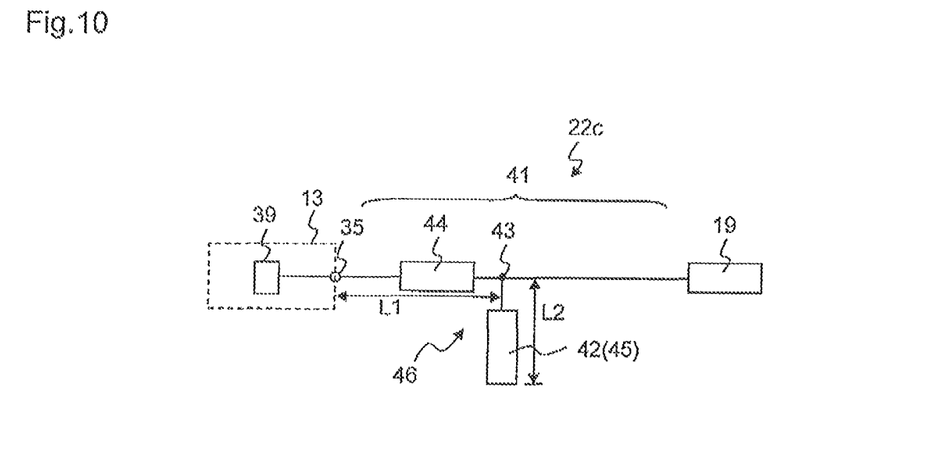
FIG. 10 is a view illustrating a matching circuit according to a first embodiment of the present invention.
Figure 11:
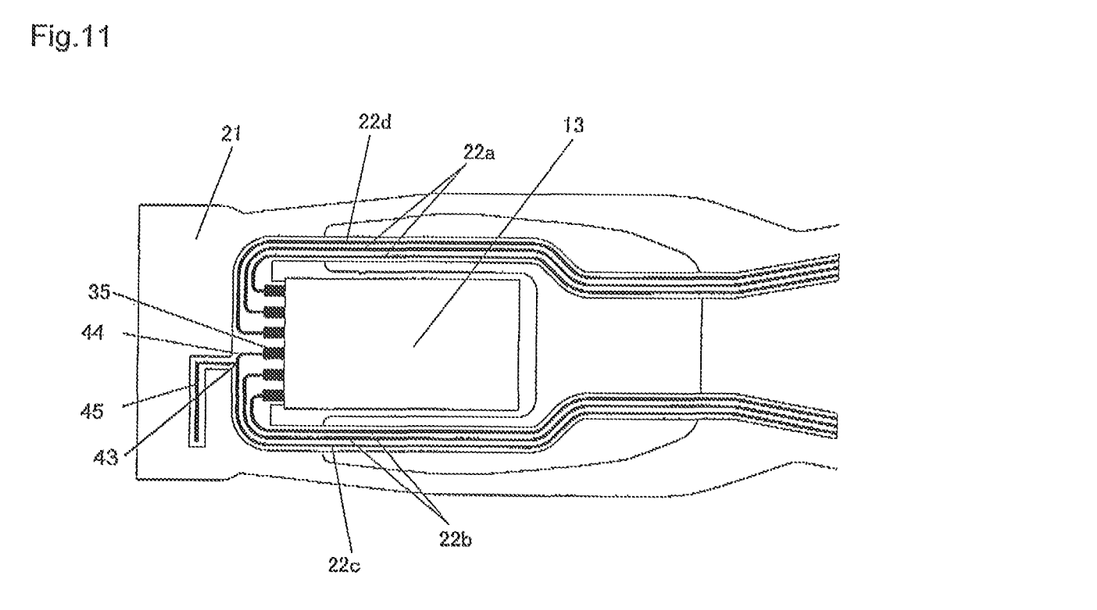
FIG. 11 is a plan view of a main portion of a head gimbal assembly provided with the matching circuit illustrated in FIG. 10.

FIG. 10 illustrates a matching circuit according to the first embodiment. FIG. 11 is a plan view of a main portion of a head gimbal assembly to which the matching circuit illustrated in FIG. 10 is applied. The microwave signal transmission line 22c includes a main transmission line 41 that connects the recording/reproducing/resonance control circuit 19 with the magnetic head slider 13, and a branch line 42 that branches from the main transmission line 41. In the main transmission line 41, a first conductive line 44 and a second conductive line 45 form the matching circuit 46, the first conductive line 44 configuring a section from the magnetic head slider 13 to a branch part 43 of the branch line 42, the second conductive line 45 configuring the branch line 42. The matching circuit 46 is arranged to achieve impedance matching between the microwave signal transmission line 22c and the microwave radiation element 39. The second conductive line 45 is an open-circuited conductive line that branches from the main transmission line 41.

Figure 12:
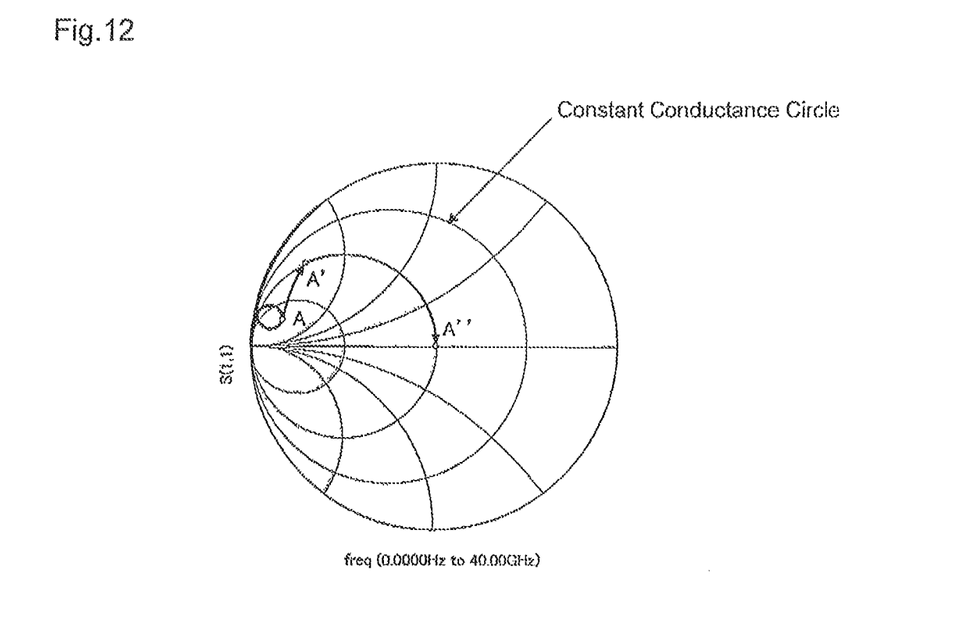
FIG. 12 is a view illustrating a locus of impedance matching by the matching circuit illustrated in FIG. 10.

FIG. 12 is an admittance chart that illustrates a locus of impedance matching by the matching circuit illustrated in FIG. 10. When a performance frequency is 10 GHz, the characteristic impedance of the first conductive line 44 is Z0, and the first conductive line 44 has a length L1 whose electrical length is approximately 10°. In FIG. 12, the first conductive line 44 moves a point A to a point A' on the constant conductance circle. When a performance frequency is 10 GHz, the characteristic impedance of the second conductive line 45 is Z0, and the second conductive line 45 has a length L2 whose electrical length is approximately 70°. The second conductive line 45 functions as a parallel capacitor that moves the point A' to a point A" on FIG. 12, the point A" being substantially the center, and performs impedance matching.

The point A in FIG. 12 periodically varies depending on the length L1 of the first conductive line 44, goes round when the electrical length is 180° at the performance frequency, and returns to the point A again. In order that the first conductive line 44 functions as the matching circuit 46, it is preferred to have the length whose electrical length is 180° or less at the performance frequency. Here, an electrical length of 180° indicates the length of ½ of the wavelength of a microwave excitation current transmitting through the first conductive line 44. When a dielectric body material that configures an insulating layer between the first conductive line 44 and the flexure is for example polyimide (εr=3.4), according to calculation, the length (physical length) L1 of the first conductive line 44 whose electrical length is 180° is approximately 80 mm when the performance frequency is 1 GHz and is approximately 1.6 mm when the performance frequency is 50 GHz. In other words, as long as the length L1 of the first conductive line 44 is 80 mm or less, it is possible to configure a matching circuit that is preferred with respect to the microwave radiation element 39 while the performance frequency is in the range from 1 GHz to 50 GHz.

In order that the second conductive line 45 functions as the parallel capacitor, it is preferred to have the length whose electrical length is 90° or less at the performance frequency. Here, the electrical length of 90° indicates the length of ¼ of the wavelength of a microwave excitation current transmitting through the second conductive line 45. When a dielectric body material that configures an insulating layer between the second conductive line 45 and the flexure is for example polyimide (∈r=3.4), according to calculation, the length (physical length) L2 of the second conductive line 45 is approximately 40 mm when the performance frequency is 1 GHz and is approximately 0.8 mm when the performance frequency is 50 GHz. In other words, as long as the length L2 of the second conductive line 45 is 40 mm or less, it is possible to configure a matching circuit that is preferred with respect to the microwave radiation element 39 while the performance frequency is in the range from 1 GHz to 50 GHz.

It is also possible to adjust the electrical length of the second conductive line 45 by changing a width size of the entire part of the line or a partial section of the line. In an example, the width size of the line is 20 μm so as to set the characteristic impedance Z0 at 50Ω; however, the width size is preferably set in the range from 1 μm to 500 μm so as not to hinder the function of the suspension that configures the head gimbal assembly.

As a result of allowing the control unit 19b of the microwave signal generating circuit 19a to perform such as to apply a microwave power of 25 mW (+14 dBm) to the terminal electrode 35, with the conventional structure, a microwave excitation current flowing into the microwave radiation element 39 was 58.5 mA. In the example, the microwave excitation current flowing into the microwave radiation element 39 from the terminal electrode 35 has been increased from 58.5 mA to 110.5 mA due to impedance matching.

At the performance frequency according to the present embodiment, the matching circuit 46 is configured by a distributed constant line. By slight change of the microwave signal transmission line 22c on the suspension 9, the effect on the gimbal function is suppressed and the preferred impedance matching can be achieved.

Also, by the impedance matching, a microwave excitation current transmitting through the microwave signal transmission line 22c on the suspension 9 is supplied to the microwave radiation element 39 on the magnetic head slider 13 while the loss due to reflection is suppressed. Therefore, this allows to achieve more efficient signal transmittal, and the microwave output power of the recording/reproducing/resonance control circuit 19 is decreased. Further, the load impedance of the recording/reproducing/resonance control circuit 19 becomes constant, thereby allowing to achieve more stabilized performance.

Figure 13:
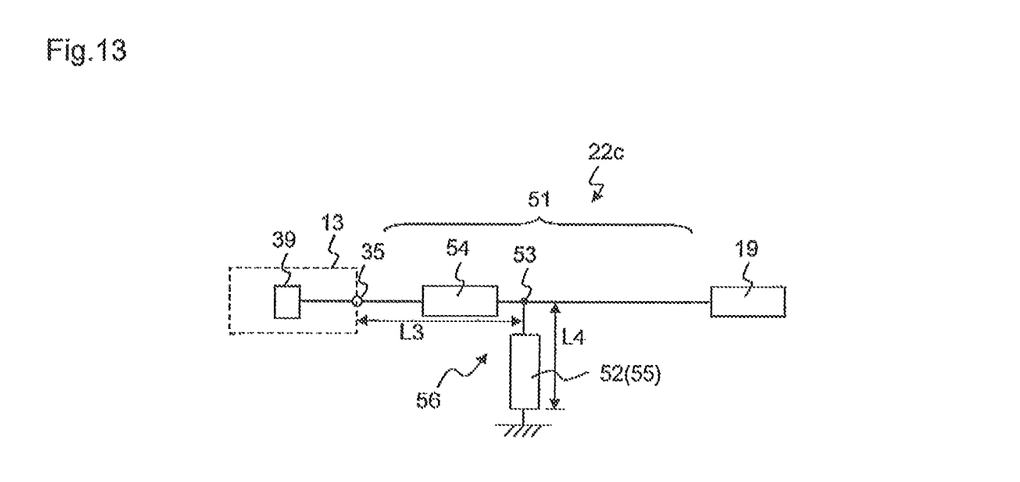
FIG. 13 is a view illustrating a matching circuit according to a second embodiment of the present invention.
Figure 14:
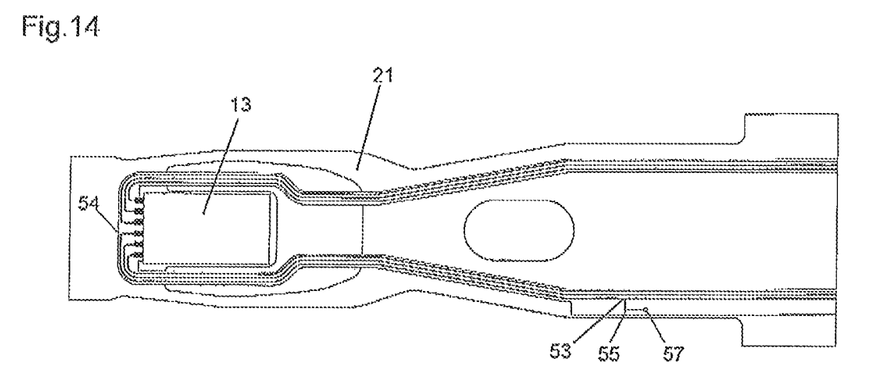
FIG. 14 is a plan view of a main portion of a head gimbal assembly provided with the matching circuit illustrated in FIG. 13.

FIG. 13 illustrates a matching circuit according to a second embodiment. FIG. 14 is a plan view of a main portion of a head gimbal assembly to which the matching circuit illustrated in FIG. 13 is applied. A microwave signal transmission line 22c according to the second embodiment has the same configuration as the one of the first embodiment. In other words, the microwave signal transmission line 22c includes a main transmission line 51 that connects the recording/reproducing/resonance control circuit 19 with the magnetic head slider 13, and a branch line 52 that branches from the main transmission line 51. In the main transmission line 51, a first conductive line 54 and a second conductive line 55 form a matching circuit 56, the first conductive line 54 configuring a section from the magnetic head slider 13 to a branch part 53 of the branch line 52, the second conductive line 55 configuring the branch line 52. The matching circuit 56 achieves impedance matching between the microwave signal transmission line 22c and the microwave radiation element 39. In the present embodiment, the second conductive line 55 is a short-circuited conductive line that branches from the main transmission line 51. The second conductive line 55 is connected to the flexure 21 by via a conductor 57, and functions as a parallel inductance at the performance frequency of 10 GHz.

Figure 15:
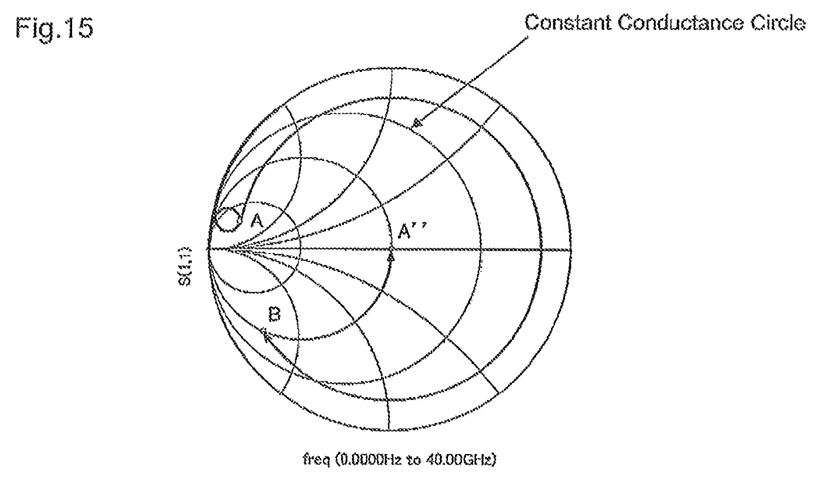
FIG. 15 is a view illustrating a locus of impedance matching by the matching circuit illustrated in FIG. 13.

FIG. 15 is an admittance chart that illustrates a locus of impedance matching by the matching circuit illustrated in FIG. 13. When a performance frequency is 10 GHz, the characteristic impedance of the first conductive line 54 is Z0, and the first conductive line 54 has a length L3 whose electrical length is approximately 160°. In FIG. 15, a point A is moved to a point B on a constant conductance circle. When a performance frequency is 10 GHz, the characteristic impedance of the second conductive line 55 is Z0, and the second conductive line 55 has a length L4 whose electrical length is approximately 20°. The second conductive line 55 functions as the parallel inductance that moves the point B to a point A" on FIG. 15, a point A" being substantially the center, and performs impedance matching.

In order that the first conductive line 54 functions as the matching circuit 56 as in the above-mentioned first embodiment, it is preferred to have the length whose electrical length is 180° or less at the performance frequency. Here, the electrical length of 180° indicates the length of ½ of the wavelength of a microwave excitation current transmitting through the first conductive line 54.

In order that the second conductive line 55 functions as the parallel inductance, it is preferred to have the length whose electrical length is 90° or less at the performance frequency. Here, the electrical length of 90° indicates the length of ¼ of the wavelength of a microwave excitation current transmitting through the second conductive line 55.

In the above-mentioned embodiments, a single line of the microwave signal transmission line 22c is used for transmission of a microwave excitation current; however, even when a differential signal transmitting wiring line is used, the same effect can be obtained due to impedance matching.

In the above-mentioned embodiments, the usage of the head gimbal assembly having the suspension that is configured with the flexure and the load beam is presupposed; however, it is also possible for a flexure to have the function of pressing the magnetic head slider toward the surface of the magnetic recording medium with a predetermined pressure by changing the thickness, material, and/or shape of the flexure (for example, to gradually widen the width of the flexure in the direction toward the head arm attachment position) although the load beam has the function in the present embodiment. Even with a head gimbal assembly having a suspension configured only with such a flexure, it is evident that similar effects can be obtained.

Several preferable embodiments of the present invention have been illustrated and described in detail; however, it is understood that various changes and modifications can be made without departing from the essence and scope of the attached claims.

What is claimed is:

1. A head gimbal assembly, comprising:
a magnetic head slider provided with a recording head element that applies a recording magnetic field to a magnetic recording medium; and
a suspension that supports the magnetic head slider, wherein
the magnetic head slider further includes a microwave radiation element that radiates a microwave magnetic field from a microwave excitation current that is supplied from a microwave generating circuit, and that applies the microwave magnetic field to the magnetic recording medium when the recording head element applies the recording magnetic field to the magnetic recording medium, the suspension includes a microwave transmission line that transmits the microwave excitation current, the microwave transmission line is provided with a matching circuit to achieve impedance matching with the microwave radiation element, the microwave transmission line includes a main transmission line that connects the microwave generating circuit with the magnetic head slider, and a branch line that branches from the main transmission line, and the matching circuit includes a first conductive line and a second conductive line, the first conductive line configuring a section in the main transmission line from the magnetic head slider to a branch part of the branch line, the second conductive line configuring the branch line.

2. The head gimbal assembly according to claim 1, wherein the second conductive line has an open end part on a side opposite to the branch part.

3. The head gimbal assembly according to claim 2, wherein a length of the first conductive line is ½ of a wavelength of the microwave excitation current or less.

4. The head gimbal assembly according to claim 3, wherein a length of the second conductive line is ¼ of a wavelength of the microwave excitation current or less.

5. The head gimbal assembly according to claim 1, wherein the second conductive line has a short-circuited end part on a side opposite to the branch part.

6. The head gimbal assembly according to claim 5, wherein a length of the first conductive line is ½ of a wavelength of the microwave excitation current or less.

7. The head gimbal assembly according to claim 6, wherein a length of the second conductive line is ¼ of a wavelength of the microwave excitation current or less.

8. The head gimbal assembly according to claim 1, wherein the matching circuit is arranged to achieve impedance matching between the microwave transmission line and the microwave radiation element with respect to the microwave excitation current that generates the microwave magnetic field at a ferromagnetic resonant frequency of the magnetic recording medium or at a frequency near the ferromagnetic resonant frequency.

9. The head gimbal assembly according to claim 8, wherein a frequency of the microwave magnetic field is 1 GHz or more and 50 GHz or less.

10. A magnetic recording device, comprising:
the head gimbal assembly according to claim 1;
the magnetic recording medium; and
the microwave radiation element.

* * * * *